UNITED STATES PATENT OFFICE.

THOMAS M. FELL AND AMBROSE G. FELL, OF NEW YORK, N. Y., ASSIGNOR TO THEMSELVES AND WILLIAM BELL.

IMPROVEMENT IN THE MANUFACTURE OF WHITE LEAD.

Specification forming part of Letters Patent No. 56,685, dated July 24, 1866.

*To all whom it may concern:*

Be it known that we, THOMAS MARA FELL and AMBROSE GEORGE FELL, both of the city of New York, in the county and State of New York, have invented certain new and useful Improvements in the Manufacture of White Lead; and we do hereby declare that the following is a full, clear, and exact description thereof, to wit:

Our said invention consists in manufacturing white lead from the ores of lead or from the metal lead direct.

First. In the treatment of ores containing lead, we first calcine or oxidize the same by means of a reverberatory furnace in the ordinary way of roasting ores.

Second. We submit the resulting oxide (which should be as free as possible from iron, copper, and other foreign matters) in contact with nitric acid diluted with water, thus forming a soluble nitrate of lead, which we do in glass or porcelain vessels.

Third. This nitrate of lead is then drawn off into a separate set of vessels and treated with sulphuric acid sufficient to precipitate the bulk of lead, but leaving a portion thereof still in solution for the purpose of preventing an excess of sulphuric acid, which would be detrimental in the after process. The precipitated sulphate of lead soon settles or subsides to the bottom of the precipitating-vessels, and is then removed for further treatment, hereinafter explained. The nitric acid thus set free can now be returned to a fresh lot of oxide, and will again extract a quantity of lead equal to the amount thrown or precipitated down by the sulphuric acid.

In the treatment of metallic lead direct no previous oxidation is required, but a similar treatment in every respect is had as already described as the second and third stages of manufacture.

The fourth manipulation or conversion of this common sulphate of lead into merchantable white lead, forms the more particular, and constitutes the principal subject-matter of our said invention, and is as follows:

The precipitated sulphate, whether derived from ores or the metal, has hitherto been of inferior value on account of its crystalline structure and want of what is termed "body or spreading quality." This objective property is entirely removed by our treatment, and a fine close-grained white-lead is the result.

We submit this sulphate derived from soluble nitrates to an intimate contact with a heated solution of potash in vessels or boilers, well stirred, the proportion being about three per cent. of the alkali and time of operation about two to three hours.

The sulphate may be derived by the use of acetic instead of nitric acid.

The effect of this alkali, which may be either potash or soda, or both, (having similar action,) is to deprive the sulphate of a portion of its acid, in combination, (sulphuric,) and thereby produce a new article, which possesses qualities superior to the best white lead of commerce. This is then washed in vats, collected and dried at a low temperature, either by heating in pans or on shelves in a building expressly constructed for air drying.

Now, it is obvious that our proportions may be changed or varied and more or less alkali used, but experiments so far have determined us to use the above quantities; also, that very near results may be obtained by the use of other alkalies or the salts of these materials; also, that the constitution of the sulphate may be first changed into a carbonate of lead by the use of the carbonates of either potash, soda, or lime, and finally treated with the alkali solution.

We find, also, by experiments that an alkali effect on this subsulphate is produced by the direct use of the carbonate of soda or potash without the after treatment by the alkali solution, giving about the same results.

We do not claim either the use of nitric acid as a solvent or the sulphuric acid as a precipitant; but What we do claim, and desire to secure by Letters Patent as our invention, is—

1. The treatment of sulphate of lead with alkaline substances or their salts, in the manner and for the purposes substantially as above described.

2. The treatment of the sulphate of lead with the carbonates of either potash, soda, or brine, followed by the alkaline substances or their salts, in the manner and for the purposes substantially as above described.

3. The treatment of subsulphate of lead with the carbonate of soda or potash in the manner and for the purposes substantially as described.

4. The manufacture of white lead from ores of lead or metallic lead by the use of nitric and sulphuric acids, in combination with alkaline substances or their salts, either with or without the prior treatment of carbonates of potash, soda, or lime, in the manner and for the purposes substantially as above set forth.

THOMAS MARA FELL.
AMBROSE GEORGE FELL.

Witnesses:
J. N. McIntire,
Charles Speer.